US011924239B2

(12) United States Patent
Ngweta et al.

(10) Patent No.: US 11,924,239 B2
(45) Date of Patent: Mar. 5, 2024

(54) VULNERABILITY AND ATTACK TECHNIQUE ASSOCIATION

(71) Applicant: International Business Machines Corporation, Armonk, NY (US)

(72) Inventors: Lilian Mathias Ngweta, Troy, NY (US); Steven Ocepek, Cuyahoga Falls, OH (US); Constantin Mircea Adam, Norwalk, CT (US); Sai Zeng, Yorktown Heights, NY (US); Muhammed Fatih Bulut, West Greenwich, RI (US); Milton H. Hernandez, Tenafly, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 424 days.

(21) Appl. No.: 17/078,455

(22) Filed: Oct. 23, 2020

(65) Prior Publication Data

US 2022/0131887 A1    Apr. 28, 2022

(51) Int. Cl.
*H04L 9/40* (2022.01)
*G06N 20/00* (2019.01)

(52) U.S. Cl.
CPC ......... *H04L 63/1433* (2013.01); *G06N 20/00* (2019.01); *H04L 63/10* (2013.01); *H04L 63/1408* (2013.01); *H04L 63/1466* (2013.01)

(58) Field of Classification Search
None
See application file for complete search history.

(56) References Cited

U.S. PATENT DOCUMENTS

| 8,793,790 | B2 | 7/2014 | Khurana et al. |
| 10,574,675 | B2 | 2/2020 | Peppe et al. |
| 2015/0381649 | A1* | 12/2015 | Schultz ............. G06Q 10/0635 726/25 |
| 2018/0018602 | A1 | 1/2018 | DiMaggio et al. |
| 2019/0098039 | A1 | 3/2019 | Gates et al. |

(Continued)

FOREIGN PATENT DOCUMENTS

WO    2016003756    1/2016

OTHER PUBLICATIONS

Li et al. "Bert-attack: Adversarial attack against bert using bert", 2020, Shanghai Key Laboratory of Intelligent Information Processing, pp. 1-10 (Year: 2020).*

(Continued)

*Primary Examiner* — Trang T Doan
(74) *Attorney, Agent, or Firm* — Amin, Turocy & Watson, LLP

(57) ABSTRACT

Systems, computer-implemented methods, and computer program products that facilitate vulnerability and attack technique association are provided. According to an embodiment, a system can comprise a memory that stores computer executable components and a processor that executes the computer executable components stored in the memory. The computer executable components can comprise a map component that defines mappings between vulnerability data representing a vulnerability of a computing resource and attack data representing at least one attack technique. The computer executable components can further comprise an estimation component that analyzes the mappings to estimate a probability that the vulnerability will be exploited to attack the computing resource.

20 Claims, 10 Drawing Sheets

(56) References Cited

U.S. PATENT DOCUMENTS

| | | | |
|---|---|---|---|
| 2019/0182273 A1 | 6/2019 | Walsh et al. | |
| 2019/0222593 A1 * | 7/2019 | Craig et al. | |
| 2020/0036743 A1 * | 1/2020 | Almukaynizi | G06N 5/048 |
| 2020/0351298 A1 * | 11/2020 | Paturi | G06N 5/04 |
| 2022/0215102 A1 * | 7/2022 | Shakarian | G06F 21/577 |
| 2022/0229912 A1 * | 7/2022 | Tavabi | H04L 63/1433 |

OTHER PUBLICATIONS

Mell et al., "The NIST Definition of Cloud Computing," Recommendations of the National Institute of Standards and Technology, NIST Special Publication 800-145, Sep. 2011, 7 pages.

Syed et al., "Supporting Situationally Aware Cybersecurity Systems," University of Maryland, Sep. 30, 2015, 26 pages.

Raina, "A Systems Perspective on Cybersecurity in the Cloud—Frameworks, Metrics and Migration Strategy," Submitted to the System Design and Management Program in Partial Fulfillment of the Requirements for the Degree of Master of Science in Engineering and Management, Massachusetts Institute of Technology, Sep. 2016, 124 pages.

Saha et al., "Identifying Vulnerabilities and Hardening Attack Graphs for Networked Systems," IEEE Symposium on Technologies for Homeland Security, 2016, 6 pages.

Mediouni et al., "Mitigating Security Risks through Attack Strategies Exploration," ISOLA 2018—8th International Symposium on Leveraging Applications of Formal Methods, Verification and Validation, Nov. 2018, 22 pages.

"Mitre Att&ck," https://attack.mitre.org/, Last accessed on Oct. 21, 2020, 3 pages.

* cited by examiner

US 11,924,239 B2

VULNERABILITY AND ATTACK TECHNIQUE ASSOCIATION

BACKGROUND

The subject disclosure relates to computing resource vulnerabilities and attack techniques used to exploit such vulnerabilities, and more specifically, to associating computing resource vulnerabilities with attack techniques used to exploit such vulnerabilities.

Securing a cloud computing environment is about understanding the vulnerabilities and also understanding the attackers' perspectives. Some existing security techniques involve assessing descriptions of attacker tactics and techniques that are based on real-world observations and developing specific threat models and methodologies. A problem with such existing security techniques is that they do not provide an association between the attack techniques and vulnerabilities of one or more components in a computing environment such as, for instance, a cloud computing environment. Another problem with such existing security techniques is that they do not enable a security analyst to match each vulnerability to respective threat actors and/or their respective attack methodologies. Another problem with such existing security techniques is that they do not enable the security analyst to develop threat models for each vulnerability.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate vulnerability and attack technique association are described.

According to an embodiment, a system can comprise a memory that stores computer executable components and a processor that executes the computer executable components stored in the memory. The computer executable components can comprise a map component that defines mappings between vulnerability data representing a vulnerability of a computing resource and attack data representing at least one attack technique. The computer executable components can further comprise an estimation component that analyzes the mappings to estimate a probability that the vulnerability will be exploited to attack the computing resource. An advantage of such a system is that it can protect the computing resource.

In some embodiments, the computer-executable components further comprise a security component that uses the mappings to generate at least one of a threat model, a vulnerability management model, or a risk management model corresponding to at least one of the vulnerability, the computing resource, the at least one attack technique, or an attacker entity, thereby facilitating improved protection of the computing resource. An advantage of such a system is that it can protect the computing resource.

According to another embodiment, a computer-implemented method can comprise employing, by a system operatively coupled to a processor, a map component to define mappings between vulnerability data representing a vulnerability of a computing resource and attack data representing at least one attack technique. The computer-implemented method can further comprise analyzing, by the system, the mappings to estimate a probability that the vulnerability will be exploited to attack the computing resource. An advantage of such a computer-implemented method is that it can be implemented to protect the computing resource.

In some embodiments, the above computer-implemented method can further comprise using, by the system, the mappings to generate at least one of a threat model, a vulnerability management model, or a risk management model corresponding to at least one of the vulnerability, the computing resource, the at least one attack technique, or an attacker entity, thereby facilitating improved protection of the computing resource. An advantage of such a computer-implemented method is that it can be implemented to protect the computing resource.

According to another embodiment, a computer program product comprising a computer readable storage medium having program instructions embodied therewith, the program instructions executable by a processor to cause the processor to employ, by the processor, a map component to define mappings between vulnerability data representing a vulnerability of a computing resource and attack data representing at least one attack technique. The program instructions are further executable by the processor to cause the processor to analyze, by the processor, the mappings to estimate a probability that the vulnerability will be exploited to attack the computing resource. An advantage of such a computer program product is that it can be implemented to protect the computing resource.

In some embodiments, the program instructions are further executable by the processor to cause the processor to use, by the processor, the mappings to generate at least one of a threat model, a vulnerability management model, or a risk management model corresponding to at least one of the vulnerability, the computing resource, the at least one attack technique, or an attacker entity, thereby facilitating improved protection of the computing resource. An advantage of such a computer program product is that it can be implemented to protect the computing resource.

DETAILED DESCRIPTION

Figure 1:
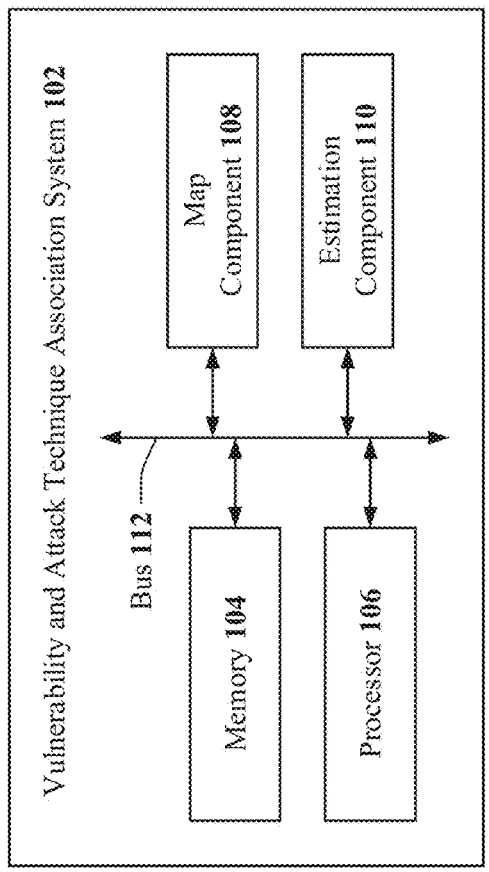
FIGS. 1, 2, 3, and 4 illustrate block diagrams of example, non-limiting systems that can facilitate vulnerability and attack technique association in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing security techniques, the present disclosure can be implemented to produce a solution to these problems in the form of systems, computer-implemented methods, and/or computer program products that can facilitate vulnerability and attack technique association by: employing a model to define mappings between vulnerability data representing a vulnerability of a computing resource and attack data representing at least one attack technique; and/or analyzing the mappings to estimate a probability that the vulnerability will be exploited to attack the computing resource. An advantage of such systems, computer-implemented methods, and/or computer program products is that they can be implemented to protect the computing resource.

In some embodiments, the present disclosure can be implemented to produce a solution to the problems described above in the form of systems, computer-implemented methods, and/or computer program products that can facilitate vulnerability and attack technique association by: using the mappings to generate at least one of a threat model, a vulnerability management model, or a risk management model corresponding to at least one of the vulnerability, the computing resource, the at least one attack technique, or an attacker entity, thereby facilitating improved protection of the computing resource. An advantage of such systems, computer-implemented methods, and/or computer program products is that they can be implemented to protect the computing resource.

As referenced herein, an "entity" can comprise a human, a client, a user, a computing device, a software application, an agent, a machine learning (ML) model, an artificial intelligence (AI) model, and/or another entity. As referenced herein, an "attacker entity" can comprise an entity as defined above that can exploit a vulnerability of a computing resource (e.g., a computing software and/or hardware resource) to attack (e.g., cyberattack) the computing resource using one or more attack techniques. As referenced herein, an "attack technique" can comprise a cyberattack technique. As referenced herein, a "security entity" can comprise an entity as defined above that can generate, develop, and/or implement one or more security measures (e.g., a threat model, vulnerability management model, a risk management model, penetration test, etc.) to prevent and/or mitigate exploitation of a computing resource vulnerability and/or an attack on the computing resource.

FIG. 1 illustrates a block diagram of an example, non-limiting system 100 that can facilitate vulnerability and attack technique association in accordance with one or more embodiments described herein. System 100 can comprise a vulnerability and attack technique association system 102. Vulnerability and attack technique association system 102 can comprise a memory 104, a processor 106, a map component 108, an estimation component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or vulnerability and attack technique association system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to vulnerability and attack technique association system 102, map component 108, estimation component 110, and/or another component associated with vulnerability and attack technique association system 102 (e.g., security component 202, collection component 302, etc.) as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Vulnerability and attack technique association system 102, memory 104, processor 106, map component 108, estimation component 110, and/or another component of vulnerability and attack technique association system 102 as described herein (e.g., security component 202, collection component 302, etc.) can be communicatively, electrically, operatively, and/or optically coupled to one another via a bus 112 to perform functions of system 100, vulnerability and attack technique association system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Vulnerability and attack technique association system 102 can comprise any type of component, machine, device, facility, apparatus, and/or instrument that comprises a processor and/or can be capable of effective and/or operative communication with a wired and/or wireless network. All such embodiments are envisioned. For example, vulnerability and attack technique association system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Vulnerability and attack technique association system 102 can be coupled (e.g., communicatively, electrically, operatively, optically, etc.) to one or more external systems, sources, and/or devices (e.g., classical and/or quantum computing devices, communication devices, etc.) using a wire and/or a cable. For example, vulnerability and attack technique association system 102 can be coupled (e.g., communicatively, electrically, operatively, optically, etc.) to one or more external systems, sources, and/or devices (e.g., classical and/or quantum computing devices, communication devices, etc.) using a data cable including, but not limited to, a High-Definition Multimedia Interface (HDMI) cable, a recommended standard (RS) 232 cable, an Ethernet cable, and/or another data cable.

In some embodiments, vulnerability and attack technique association system 102 can be coupled (e.g., communicatively, electrically, operatively, optically, etc.) to one or more external systems, sources, and/or devices (e.g., classical and/or quantum computing devices, communication devices, etc.) via a network. For example, such a network can comprise wired and/or wireless networks, including, but not limited to, a cellular network, a wide area network (WAN) (e.g., the Internet) or a local area network (LAN). vulnerability and attack technique association system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, vulnerability and attack technique association system 102 can comprise hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that can facilitate communicating information between vulnerability and attack technique association system 102 and external systems, sources, and/or devices (e.g., computing devices, communication devices, etc.).

Vulnerability and attack technique association system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with vulnerability and attack technique association system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, map component 108, estimation component 110, and/or any other components associated with vulnerability and attack technique association system 102 (e.g., security component 202, collection component 302, etc.) as disclosed herein (e.g., communicatively, electronically, operatively, and/or optically coupled with and/or employed by vulnerability and attack technique association system 102), can comprise such computer and/or machine readable, writable, and/or executable component(s) and/or instruction(s). Consequently, according to numerous embodiments, vulnerability and attack technique association system 102 and/or any components associated therewith as disclosed herein, can employ processor 106 to execute such computer and/or machine readable, writable, and/or executable component(s) and/or instruction(s) to facilitate performance of one or more operations described herein with reference to vulnerability and attack technique association system 102 and/or any such components associated therewith.

Vulnerability and attack technique association system 102 can facilitate (e.g., via processor 106) performance of operations executed by and/or associated with map component 108, estimation component 110, and/or another component associated with vulnerability and attack technique association system 102 as disclosed herein (e.g., security component 202, collection component 302, etc.). For example, as described in detail below, vulnerability and attack technique association system 102 can facilitate (e.g., via processor 106): employing a model to define mappings between vulnerability data representing a vulnerability of a computing resource and attack data representing at least one attack technique; and/or analyzing the mappings to estimate a probability that the vulnerability will be exploited to attack (e.g., cyberattack) the computing resource.

In another example, as described in detail below, vulnerability and attack technique association system 102 can further facilitate (e.g., via processor 106): monitoring at least one vulnerability data feed source and at least one attack data feed source; collecting vulnerability data from the at least one vulnerability data feed source and attack data from the at least one attack data feed source; employing a model to define mappings between the vulnerability data representing a vulnerability of a computing resource and the attack data representing at least one attack technique; employing the model to define the mappings using a similarity learning process; analyzing the mappings to estimate a probability that the vulnerability will be exploited to attack the computing resource; employing the model to refine the mappings using an active learning process, where the mappings are refined based on expert entity feedback; using the mappings to identify one or more attacker entities having a defined probability of exploiting the vulnerability to attack the computing resource; using the mappings to generate at least one of a threat model, a vulnerability management model, or a risk management model corresponding to at least one of the vulnerability, the computing resource, the at least one attack technique, or an attacker entity, thereby facilitating improved protection of the computing resource; and/or using the mappings to perform a penetration test on one or more computing resources.

Map component 108 can employ a model to define mappings between vulnerability data representing a vulnerability of a computing resource and attack data representing at least one attack technique. For example, map component 108 can employ one or more machine learning (ML) and/or artificial intelligence (AI) models that can perform a similarity learning process and/or a similarity search process to define mappings (e.g., associations, relationships, etc.) between vulnerability data representing a vulnerability of a computing resource (e.g., a computing software and/or hardware resource) and attack data representing at least one attack technique (e.g., at least one cyberattack technique used by one or more attacker entities to exploit the vulnerability).

In some embodiments, map component 108 can employ one or more ML and/or AI models that are based on and/or can perform natural language processing (NLP) using a similarity learning process and/or a similarity search process to define the above described mappings. For example, such one or more ML and/or AI models can include, but are not limited to, a pretrained language representation model (e.g., transformer based) with fine-tuning (e.g., a bidirectional encoder representations from transformers (BERT) model), a long short-term memory (LSTM) model, a bidirectional LSTM model with a conditional random field (CRF) layer (abbreviated as BiLSTM-CRF), a shallow or deep neural network model, a convolutional neural network (CNN) model, a decision tree classifier, and/or any supervised or unsupervised ML and/or AI model that can perform natural language processing (NLP) using a similarity learning process and/or a similarity search process to define the above described mappings. In the example embodiment depicted in FIG. 1, map component 108 can employ a BERT model to define mappings (e.g., associations, relationships, etc.) between vulnerability data representing a vulnerability of a computing resource (e.g., a computing software and/or hardware resource) and attack data representing at least one attack technique (e.g., attack technique(s) used by one or more attacker entities to exploit the vulnerability).

To define mappings between the above described vulnerability data and attack data, map component 108 can employ a model (e.g., a BERT model) to create numerical representations of the vulnerability data and attack data that can then be used to define the mappings. For example, map component 108 can employ a model (e.g., a BERT model) to create a first numerical representation of a vulnerability of a computing resource and a set of second numerical representations for the attack data, where each of such second numerical representations corresponds to a certain attack technique. The first numerical representation can comprise a numerical representation of a structured, unstructured, labeled, and/or unlabeled description (e.g., textual description, alphanumeric description, etc.) of a vulnerability corresponding to a computing resource. Each of the second numerical representations in the set of second numerical representations can comprise a numerical representation of a structured, unstructured, labeled, and/or unlabeled description (e.g., textual description, alphanumeric description, etc.) of a certain attack technique.

The first numerical representation and/or each of such second numerical representations in the set of second numerical representations described above can comprise a point defined in a multi-dimensional space and/or a Euclidean space. The position of the first numerical representation in such a multi-dimensional and/or Euclidean space relative to the position of each of the second numerical representations can define the mappings, associations, and/or relationships between such numerical representations. For example, a certain second numerical representation that is positioned closer to the first numerical representation than another second numerical representation has a relatively stronger association and/or a relatively closer relationship with the first numerical representation. The distance (e.g., Euclidean distance) between a position of the first numerical representation and a position of a certain second numerical representation can constitute a similarity score that represents a comparison between the first numerical representation and such a certain second numerical representation. As described below, estimation component 110 can calculate and/or use the similarity scores that can respectively correspond to the first numerical representation and each of the second numerical representations to estimate a probability that the vulnerability will be exploited to attack the computing resource (e.g., to estimate a probability that the vulnerability will be exploited by using a certain attack technique).

Estimation component 110 can analyze the above described mappings to estimate a probability that the vulnerability will be exploited to attack the computing resource. For example, estimation component 110 can analyze the above described mappings (e.g., associations, relationships, etc.) to estimate a probability (e.g., a relative probability) that the vulnerability will be exploited by one or more attacker entities to attack the computing resource using a certain attack technique.

To estimate such a probability described above, estimation component 110 can analyze the mappings that can be defined by map component 108 as described above (e.g., via employing a BERT model) and calculate a similarity score for each of the second numerical representations relative to the first numerical representation. Estimation component 110 can then use such similarity scores to determine which of such second numerical representations has the strongest association and/or closest relationship with the first numerical representation. The second numerical representation having, for example, the highest similarity score relative to all the other second numerical representations can constitute the attack technique that is most likely to be used by an attacker entity to exploit the vulnerability and attack the computing resource.

To calculate a similarity score for each of the second numerical representations relative to the first numerical representation, estimation component 110 can calculate the respective distances (e.g., respective Euclidean distances) between each of the second numerical representations and the first numerical representation to determine which of such second numerical representations is positioned closest to the first numerical representation. The second numerical representation that is positioned, for example, closest to the first numerical representation relative to all the other second numerical representations can have, for instance, the highest similarity score. As described above, the second numerical representation having, for example, the highest similarity score relative to all the other second numerical representations can constitute the attack technique that is most likely to be used by an attacker entity to exploit the vulnerability and attack the computing resource.

Based on the values of such similarity scores, that is, the respective distances between the first numerical representation and each of the second numerical representations, estimation component 110 can estimate a probability that the vulnerability will be exploited to attack the computing resource. For example, estimation component 110 can identify one or more attack techniques (e.g., one or more second numerical representations) that are positioned within a defined distance (e.g., within a defined radius) from the vulnerability (e.g., the first numerical representation). In this example, based on such identification of one or more attack techniques positioned within a defined distance from the vulnerability, estimation component 110 can then estimate, for instance, a relatively high probability that the vulnerability will be exploited by one or more attacker entities using such one or more attack techniques to attack the computing resource. In another example, estimation component 110 does not identify one or more attack techniques (e.g., one or more second numerical representations) that are positioned within such a defined distance (e.g., within a defined radius) from the vulnerability (e.g., the first numerical representation). In this example, by not identifying one or more attack techniques positioned within a defined distance from the vulnerability, estimation component 110 can then estimate, for instance, a relatively low probability that the vulnerability will be exploited by one or more attacker entities using such one or more attack techniques to attack the computing resource.

In some embodiments, vulnerability and attack technique association system 102 can be associated with a cloud computing environment. For example, vulnerability and attack technique association system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Vulnerability and attack technique association system 102 and/or components thereof (e.g., map component 108, estimation component 110, security component 202, collection component 302, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by vulnerability and attack technique association system 102 and/or components thereof to execute one or more operations in accordance with one or more embodiments of the subject disclosure described herein. For instance, vulnerability and attack technique association system 102 and/or components thereof can employ such one or more classical and/or quantum computing resources to execute one or more classical and/or quantum: mathematical function, calculation, and/or equation; computing and/or processing script; algorithm; model (e.g., AI model, ML model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
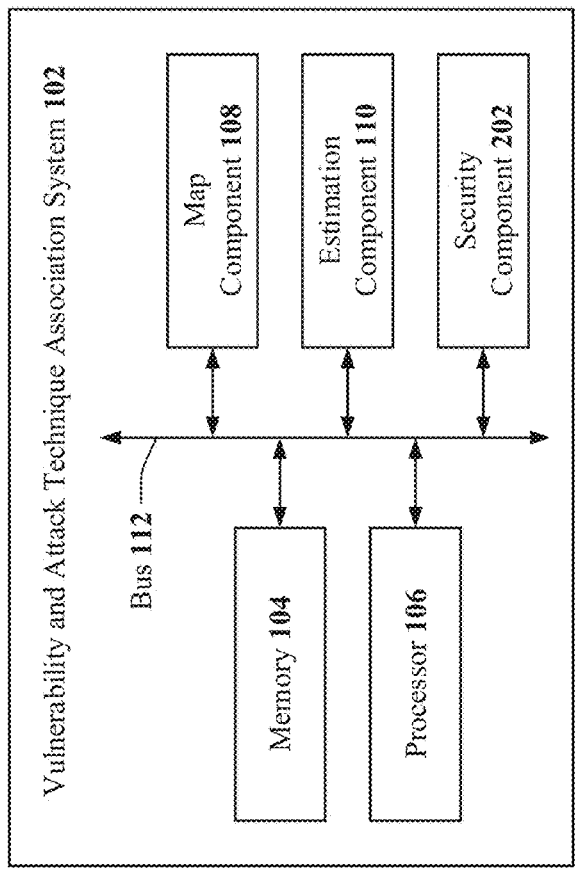

FIG. 2 illustrates a block diagram of an example, non-limiting system 200 that can facilitate vulnerability and attack technique association in accordance with one or more embodiments described herein. System 200 can comprise vulnerability and attack technique association system 102, which can further comprise a security component 202. Repetitive description of like elements and/or processes employed in respective embodiments is omitted for sake of brevity.

Security component 202 can use the above described mappings that can be generated by map component 108 to identify one or more attacker entities having a defined probability of exploiting the vulnerability to attack the computing resource. Security component 202 can comprise a security entity. For example, security component 202 can comprise a security analyst entity, including, but not limited to, a human, a computing device, a software application, an agent, an ML model, an AI model, and/or another entity that can serve as and/or function as a security analyst entity.

Security component 202 can use the above described mappings to identify such one or more attacker entities by analyzing the one or more attack techniques (e.g., one or more second numerical representations) that can be identified by estimation component 110 as being positioned within or outside of a defined distance (e.g., within or outside of a defined radius) from the vulnerability (e.g., the first numerical representation) in a multi-dimensional and/or Euclidean space. For example, as described above with reference to the example embodiment illustrated in FIG. 1, estimation component 110 can identify one or more attack techniques (e.g., one or more second numerical representations) that are positioned within a defined distance (e.g., within a defined radius) from the vulnerability (e.g., the first numerical representation) in a multi-dimensional and/or Euclidean space. In this example, based on such identification of one or more attack techniques positioned within a defined distance from the vulnerability, estimation component 110 can then estimate, for instance, a relatively high probability that the vulnerability will be exploited by one or more attacker entities using such one or more attack techniques to attack the computing resource.

In the above example, security component 202 can use such one or more attack techniques to identify one or more attacker entities that have used such one or more attack techniques to exploit the vulnerability and/or a similar vulnerability to attack one or more computing resources. For example, security component 202 can analyze data of one or more attack data feed sources (e.g., knowledge bases, security reports, blogs, and other similar resources.) that describes one or more attack techniques that have been used to exploit the vulnerability, where such data further maps the one or more attack techniques to one or more attacker entities that use such one or more attack techniques. In this example, by identifying such one or more attacker entities using such one or more attack techniques having a relatively high probability of being used to exploit the vulnerability and attack the computing resource, security component 202 can thereby identify one or more attacker entities having a relatively high probability of exploiting the vulnerability to attack the computing resource (e.g., using such one or more attack techniques).

Security component 202 can use the mappings to generate at least one of a threat model, a vulnerability management model, or a risk management model corresponding to at least one of the vulnerability, the computing resource, the at least one attack technique, or an attacker entity, thereby facilitating improved protection of the computing resource. For example, based on calculating various similarity scores as described above between the vulnerability and different attack techniques, estimation component 110 can further use the similarity scores to estimate various probabilities that such different attack techniques will be used to exploit the vulnerability and attack the computing resource. For instance, estimation component 110 can use such similarity scores to identify: one or more attack techniques having relatively low probability (e.g., relative to all attack techniques analyzed by estimation component 110) of being used to exploit the vulnerability and attack the computing resource; one or more attack techniques having relatively moderate probability (e.g., relative to all attack techniques analyzed by estimation component 110) of being used to exploit the vulnerability and attack the computing resource; and/or one or more attack techniques having relatively high probability (e.g., relative to all attack techniques analyzed by estimation component 110) of being used to exploit the vulnerability and attack the computing resource. Security component 202 can further analyze data from one or more attack data feed sources as described above to identify one or more attacker entities that use such one or more relatively low, moderate, and/or high probability attack techniques. Security component 202 can then respectively associate (e.g., designate) such one or more attacker entities with the same relatively low, moderate, or high probability corresponding to the one or more attack techniques they use.

Security component 202 can use the above described relatively low, moderate, and/or high probability designations associated with one or more attack techniques and/or one or more attacker entities to assign various levels of risk corresponding to different attack techniques and/or to different attacker entities. For example, security component 202 can assign: a relatively low risk designation to one or more attack techniques and/or one or more attacker entities (e.g., relative to all attack techniques and/or attacker entities analyzed by security component 202) having a relatively low probability designation; a relatively moderate risk designation to one or more attack techniques and/or one or more attacker entities (e.g., relative to all attack techniques and/or attacker entities analyzed by security component 202) having a relatively moderate probability designation; and/or a relatively high risk designation to one or more attack techniques and/or one or more attacker entities (e.g., relative to all attack techniques and/or attacker entities analyzed by security component 202) having a relatively high probability designation.

Security component 202 can then use such relatively low, moderate, and/or high probability designations and/or such relatively low, moderate, and/or high risk designations to generate a threat model, a vulnerability management model, and/or a risk management model corresponding to the vulnerability, the computing resource, the one or more attack techniques, and/or the one or more attacker entities. For example, security component 202 can use such relatively low, moderate, and/or high probability designations and/or such relatively low, moderate, and/or high risk designations to generate a threat model, a vulnerability management model, and/or a risk management model that: identifies and/or describes the vulnerability, the computing resource, the one or more attack techniques, and/or the one or more attacker entities; defines and/or quantifies such relatively low, moderate, and/or high probability designations and/or such relatively low, moderate, and/or high risk designations corresponding to the one or more attack techniques and/or the one or more attacker entities; and/or prioritizes methods (e.g., security strategies, techniques, etc.) that can be implemented to prevent and/or mitigate exploitation of the vulnerability to attack the computing resource based on such relatively low, moderate, and/or high probability designations and/or such relatively low, moderate, and/or high risk designations. For example, security component 202 can generate a threat model, a vulnerability management model, and/or a risk management model that prioritizes security methods that can be implemented to prevent and/or mitigate exploitation of the vulnerability to attack the computing resource using one or more of such relatively high probability and/or relatively high risk attack techniques. In another example, security component 202 can generate a threat model, a vulnerability management model, and/or a risk management model that prioritizes security methods that can be implemented to prevent and/or mitigate exploitation of the vulnerability by one or more of such relatively high probability and/or relatively high risk attacker entities using one or more of such relatively high probability and/or relatively high risk attack techniques.

Security component 202 can also use the mappings to perform a penetration test (also referred to as a "pen test") on one or more computing resources. For example, as described above, estimation component 110 can use the mappings to calculate similarity scores corresponding to the vulnerability and respective attack techniques. In this example, estimation component 110 can then use the similarity scores to identify the above described one or more attack techniques having a relatively low, moderate, and/or high probability of being used to exploit the vulnerability to attack the computing resource. In this example, as described above, security component 202 can then use such one or more relatively low, moderate, and/or high probability attack techniques to generate a threat model, a vulnerability management model, and/or a risk management model that prioritizes security methods that can be implemented to prevent and/or mitigate exploitation of the vulnerability. In this example, such security methods can comprise a penetration test (e.g., an authorized and simulated cyberattack on a computing system to evaluate the security of the system) that security component 202 can perform on the computing resource and/or another computing resource.

Security component 202 can implement such a penetration test (e.g., via a penetration testing software application, manually, etc.) using one or more of the relatively low, moderate, and/or high probability attack techniques that can be identified by estimation component 110 using the mappings as described above. For instance, security component 202 can implement such a penetration test on the computing resource, and/or on a computing system comprising the computing resource, using the above described one or more relatively low, moderate, and/or high probability attack techniques to determine whether the vulnerability can be exploited to attack the computing resource using such one or more relatively low, moderate, and/or high probability attack techniques.

Figure 3:
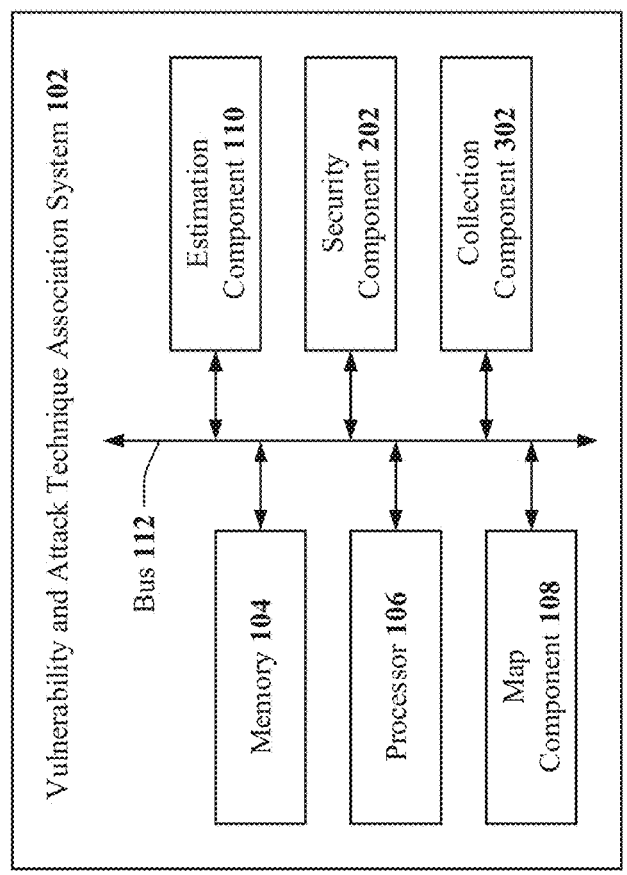

FIG. 3 illustrates a block diagram of an example, non-limiting system 300 that can facilitate vulnerability and attack technique association in accordance with one or more embodiments described herein. System 300 can comprise vulnerability and attack technique association system 102, which can further comprise a collection component 302. Repetitive description of like elements and/or processes employed in respective embodiments is omitted for sake of brevity.

Collection component 302 can monitor at least one vulnerability data feed source and/or at least one attack data feed source. Collection component 302 can further collect vulnerability data from such at least one vulnerability data feed source and/or attack data from the at least one attack data feed source. For example, collection component 302 can monitor at least one vulnerability data feed source (e.g., the National Vulnerability Database (NVD), knowledge bases, security reports, blogs, or similar resources.) and can further collect one or more structured, unstructured, labeled, and/or unlabeled descriptions (e.g., textual description, alphanumeric description, or similar descriptions.) of one or more vulnerabilities corresponding to one or more computing resources. In another example, collection component 302 can monitor at least one attack data feed source (e.g., knowledge bases, security reports, blogs, or similar resources.) and can further collect one or more structured, unstructured, labeled, and/or unlabeled descriptions (e.g., textual description, alphanumeric description, or similar descriptions.) of one or more attack techniques that can be used to exploit a computing resource vulnerability to attack the computing resource. In these examples, such one or more structured, unstructured, labeled, and/or unlabeled descriptions of such one or more vulnerabilities and/or such one or more attack techniques can be used by map component 108 to define the mappings between a vulnerability of a computing resource and one or more attack techniques as described above with reference to the example embodiments depicted in FIGS. 1 and 2.

To facilitate the above described monitoring and/or data collection operations, collection component 302 can comprise and/or employ an agent (e.g., a monitoring agent, an application, software script, processing threads, or other similar resources.) that can be deployed, for instance, over a network (e.g., the Internet, or other similar resources.) to monitor such data feed sources and collect such vulnerability and attack data described above. In some embodiments, collection component 302 can continuously (e.g., uninterrupted, in real-time, or other suitable states.) monitor such data feed sources and immediately collect newly released vulnerability and attack data as soon as it is made available on such data feed sources. In some embodiments, collection component 302 can periodically (e.g., once a second, once a minute, or at other suitable rates.) monitor such data feed sources and collect newly released vulnerability and attack data that has been made available on such data feed sources since collection component 302 last monitored the data feed sources.

Figure 4:
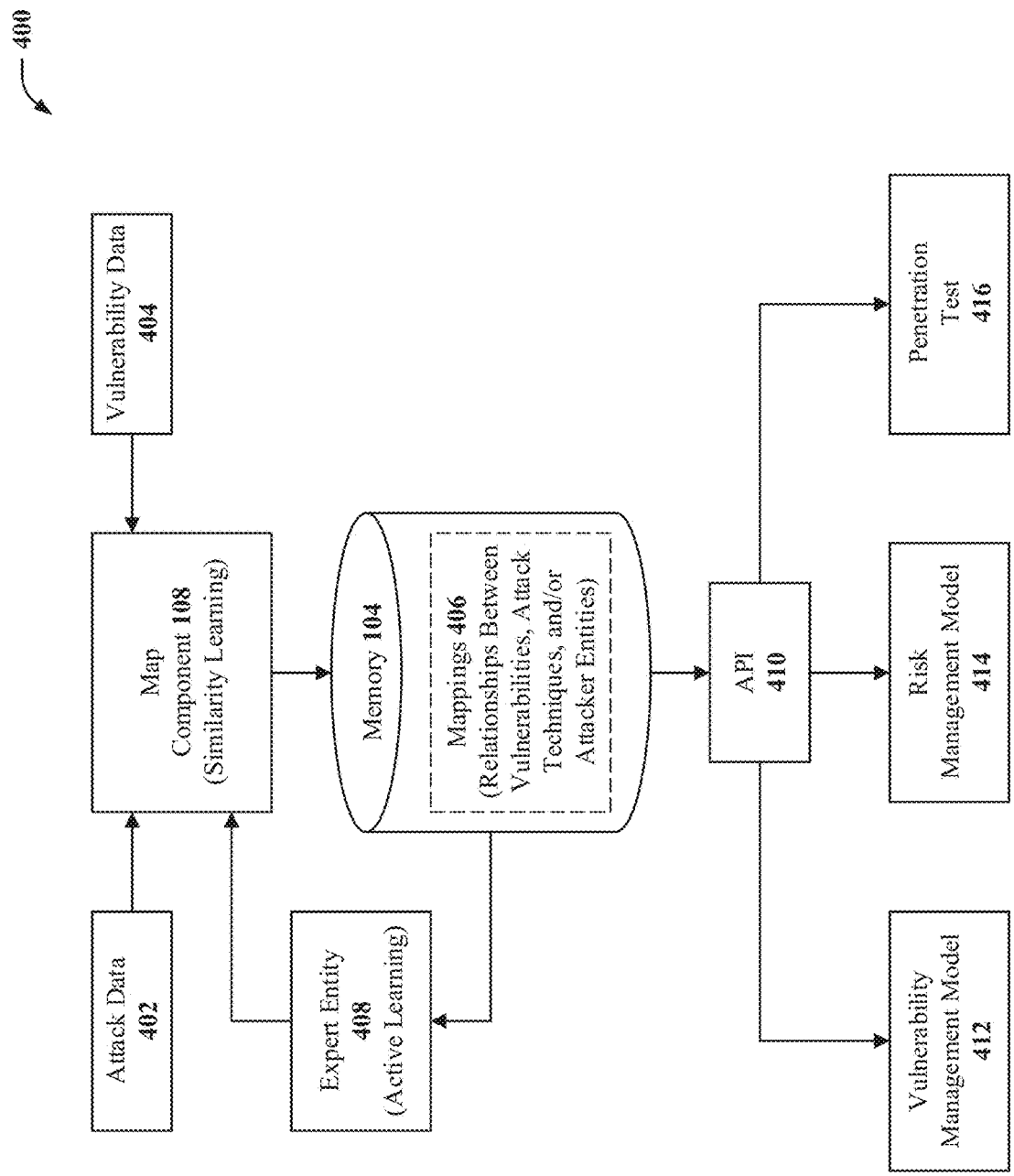

FIG. 4 illustrates a block diagram of an example, non-limiting system 400 that can facilitate vulnerability and attack technique association in accordance with one or more embodiments described herein. Repetitive description of like elements and/or processes employed in respective embodiments is omitted for sake of brevity.

As illustrated in the example embodiment depicted in FIG. 4, map component 108 of system 400 can receive attack data 402 and/or vulnerability data 404. Attack data 402 can comprise one or more structured, unstructured, labeled, and/or unlabeled descriptions (e.g., textual description, alphanumeric description, or other suitable descriptions.) of one or more attack techniques that can be used to exploit a computing resource vulnerability to attack the computing resource. Attack data 402 can comprise the same attributes and/or information as that of the attack data described above with reference to the example embodiment illustrated in FIG. 1, where such attack data can be representative of at least one attack technique. Vulnerability data 404 can comprise one or more structured, unstructured, labeled, and/or unlabeled descriptions (e.g., textual description, alphanumeric description, or other suitable descriptions.) of one or more vulnerabilities corresponding to one or more computing resources. Vulnerability data 404 can comprise the same attributes and/or information as that of the vulnerability data described above with reference to the example embodiment illustrated in FIG. 1, where such vulnerability data can be representative of a vulnerability of a computing resource.

Attack data 402 and/or vulnerability data 404 can be collected by collection component 302 as described above with reference to the example embodiment illustrated in FIG. 3. In the example embodiment depicted in FIG. 4, collection component 302 can further provide attack data 402 and/or vulnerability data 404 to map component 108.

Based on receiving attack data 402 and vulnerability data 404, map component 108 can employ one or more ML and/or AI models that can perform a similarity learning process and/or a similarity search process to define mappings 406 (e.g., associations, relationships, or other suitable correlations.) between attack data 402 that can be representative of at least one attack technique and vulnerability data 404 that can be representative of a vulnerability of a computing resource. For example, map component 108 can employ a BERT model that can perform a similarity learning process and/or a similarity search process to define mappings 406 between attack data 402 and vulnerability data 404. In this example, map component 108 can perform (e.g., using a BERT model) such a similarity learning process and/or such a similarity search process to define mappings 406 between attack data 402 and vulnerability data 404 as described above with reference to the example embodiment illustrated in FIG. 1. For instance, map component 108 can perform (e.g., using a BERT model) such a similarity learning process and/or such a similarity search process to define mappings 406 using numerical representations of attack data 402 and vulnerability data 404 in a multi-dimensional space to determine one or more similarity scores corresponding respectively to a vulnerability and one or more attack techniques. In this example, such one or more similarity scores can respectively define the strength of a relationship and/or an association (e.g., a mapping) between such a vulnerability and each of such one or more attack techniques.

As illustrated in the example embodiment depicted in FIG. 4, based on defining mappings 406 as described above, map component 108 can further store mappings 406 in a database such as, for instance, memory 104. In some embodiments, map component 108 and/or collection component 302 can store attack data 402 and/or vulnerability data 404 in a database such as, for instance, memory 104 as illustrated in FIG. 4. In these embodiments, attack data 402 can comprise mappings between one or more attack techniques used by one or more attacker entities, as attack data 402 can comprise information that specifies the attack technique(s) used by each attacker entity identified in attack data 402.

In the example embodiment illustrated in FIG. 4, map component 108 can employ such one or more ML and/or AI models described above (e.g., a BERT model) to refine mappings 406 using an active learning process, where mappings 406 can be refined based on expert entity feedback from expert entity 408. Expert entity 408 can comprise an expert entity including, but not limited to, a human (e.g., a subject matter expert (SME), etc.), a computing device, a software application, an expert agent, an ML model, an AI model, and/or another expert entity. In the example embodiment depicted in FIG. 4, expert entity 408 can validate or invalidate one or more mappings 406 that have been defined by map component 108 and/or stored in, for instance, memory 104. For example, expert entity 408 can validate or invalidate a certain mapping 406 between a specific vulnerability and one or more specific attack techniques. In some embodiments, expert entity 408 can validate or invalidate a certain mapping 406 between a specific vulnerability and one or more specific attack techniques based on, for example: technical experience (e.g., technical experience of an expert entity such as, for instance, a subject matter expert (SME)); mappings 406 that have been previously validated or invalidated (e.g., by expert entity 408); and/or other data.

In the example embodiment illustrated in FIG. 4, map component 108 can employ such one or more ML and/or AI models described above (e.g., a BERT model) to refine mappings 406 based on such expert entity feedback received from expert entity 408. In this example embodiment, map component 108 can refine mappings 406 based on such expert entity feedback received from expert entity 408 by rerunning the similarity learning process (e.g., using a BERT model) to refine the above described numerical representations of attack data 402 and/or vulnerability data 404 based on such expert entity feedback received from expert entity

408. In this example embodiment, refining mappings 406 based on such expert entity feedback received from expert entity 408 can constitute an active learning process. In this example embodiment, map component 108 can store refined versions of mappings 406 in, for instance, memory 104.

As illustrated in the example embodiment depicted in FIG. 4, mappings 406 and/or refined versions of mappings 406 can be provided to an application programming interface (API) 410. For example, vulnerability and attack technique association system 102 and/or map component 108 can provide mappings 406 and/or refined versions of mappings 406 over a network (e.g., the Internet) to application programming interface (API) 410. In some embodiments, a security entity such as, for example, a security analyst entity can obtain mappings 406 and/or refined versions of mappings 406 via application programming interface (API) 410 and further use such mappings to generate a vulnerability management model 412 and/or a risk management model 414. For example, with reference to the example embodiment depicted in FIG. 2, such a security analyst entity can use mappings 406 and/or refined versions of mappings 406 to generate vulnerability management model 412 and/or risk management model 414 in the same manner as security component 202 uses mappings defined by map component 108 to generate a vulnerability management model and/or a risk management model. In some embodiments, such a security analyst entity can also use mappings 406 and/or refined versions of mappings 406 to perform a penetration test 416. For example, with reference to the example embodiment depicted in FIG. 2, such a security analyst entity can use mappings 406 and/or refined versions of mappings 406 to perform penetration test 416 in the same manner as security component 202 uses mappings defined by map component 108 to perform a penetration test.

Figure 5:
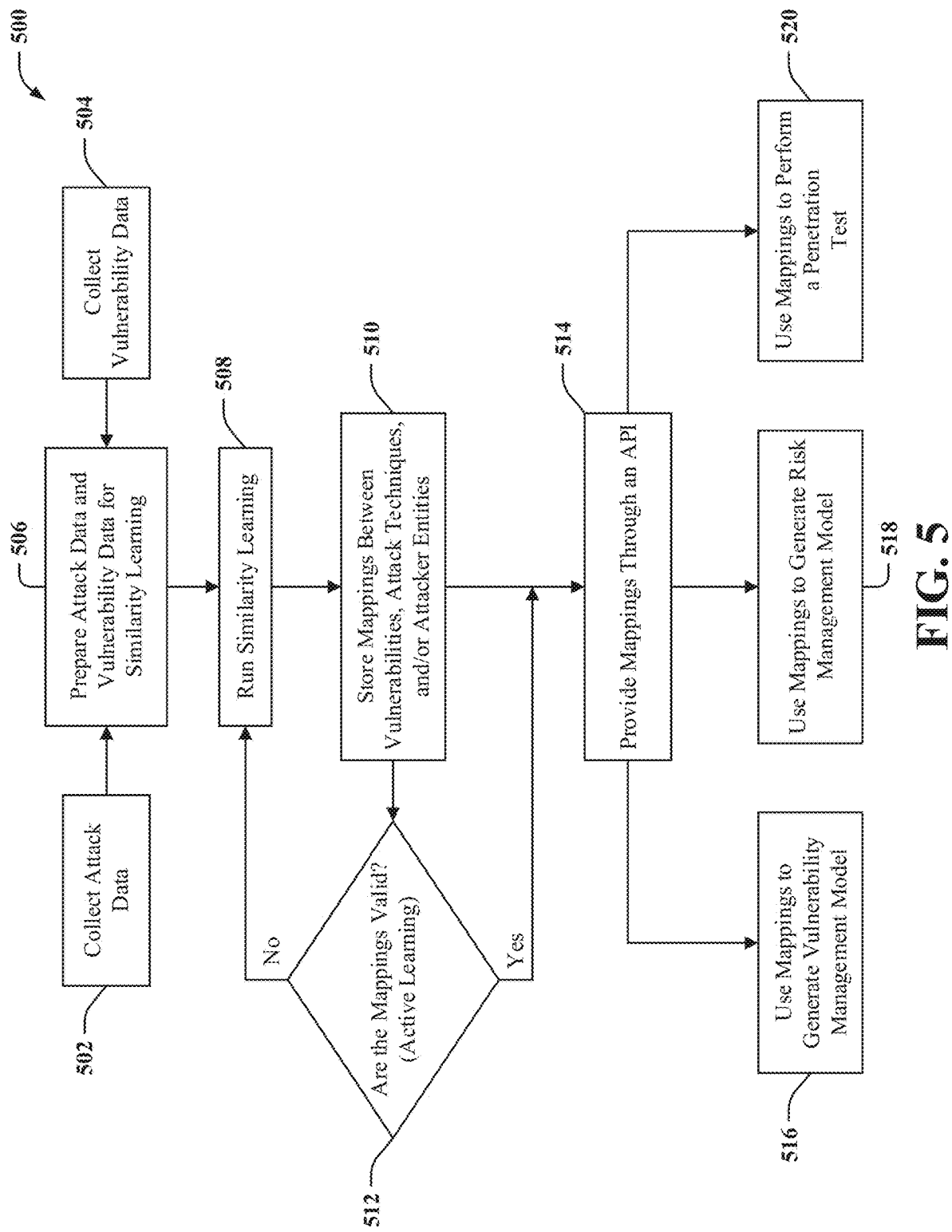
FIGS. 5, 6, and 7 illustrate flow diagrams of example, non-limiting computer-implemented methods that can facilitate vulnerability and attack technique association in accordance with one or more embodiments described herein.

FIG. 5 illustrates a flow diagram of an example, non-limiting computer-implemented method 500 that can facilitate vulnerability and attack technique association in accordance with one or more embodiments described herein. Repetitive description of like elements and/or processes employed in respective embodiments is omitted for sake of brevity.

At 502, computer-implemented method 500 can comprise collecting (e.g., via collection component 302) attack data (e.g., attack data 402).

At 504, computer-implemented method 500 can comprise collecting (e.g., via collection component 302) vulnerability data (e.g., vulnerability data 404).

At 506, computer-implemented method 500 can comprise preparing (e.g., via vulnerability and attack technique association system 102 and/or map component 108) the attack data and vulnerability data for similarity learning. For example, vulnerability and attack technique association system 102 and/or map component 108 can preprocess the attack data and vulnerability data collected by collection component 302. For instance, vulnerability and attack technique association system 102 and/or map component 108 can preprocess the attack data and vulnerability data using one or more embedding algorithms (e.g., doc2vec, word2vec, etc.) that can generate the above described numerical representations of the attack data and vulnerability data as described above with reference to the example embodiments depicted in FIGS. 1, 2, and 4.

At 508, computer-implemented method 500 can comprise running (e.g., via map component 108) similarity learning. For example, as described above with reference to the example embodiment depicted in FIG. 1, map component 108 can employ a model (e.g., a BERT model) that can perform a similarity learning process to define mappings (e.g., mappings 406) between a vulnerability of a computing resource and one or more attack techniques.

At 510, computer-implemented method 500 can comprise storing (e.g., via map component 108 and/or collection component 302) mappings between vulnerabilities, attack techniques, and/or attacker entities. For example, map component 108 can store the mappings generated at operation 508 in a database such as, for instance, memory 104. In this example, map component 108 and/or collection component 302 can also store the attack data (e.g., attack data 402) collected at operation 502 in memory 104. In this example, such attack data can comprise mappings between one or more attack techniques used by one or more attacker entities, as such attack data can comprise information that specifies the attack technique(s) used by each attacker entity identified in the attack data.

At 512, computer-implemented method 500 can comprise determining (e.g., via expert entity 408) whether the mappings are valid. For example, as described above with reference to the example embodiment depicted in FIG. 4, expert entity 408 can validate or invalidate mappings (e.g., mappings 406) that have been defined by map component 108 and/or stored in, for instance, memory 104. In the example embodiment depicted in FIG. 5, at 512, expert entity 408 can validate or invalidate the mappings generated at operation 508 as described above. For instance, at 512, expert entity 408 can validate mappings between a specific vulnerability and one or more specific attack techniques. In some embodiments, expert entity 408 can validate or invalidate the mappings between a specific vulnerability and one or more specific attack techniques based on, for example: technical experience (e.g., technical experience of an expert entity such as, for instance, a subject matter expert (SME)); mappings that have been previously validated or invalidated (e.g., by expert entity 408); and/or other data.

If it is determined (e.g., by expert entity 408) at operation 512 that the mappings are not valid, computer-implemented method 500 can comprise returning to operation 508 to rerun similarity learning based on expert entity feedback obtained at operation 512. For example, at 508, map component 108 can employ one or more ML and/or AI models (e.g., a BERT model) to refine such mapping(s) using an active learning process, where the mapping(s) can be refined based on expert entity feedback received from expert entity 408. For instance, map component 108 can refine the mappings based on such expert entity feedback by rerunning the similarity learning process at operation 508 (e.g., using a BERT model) to refine the above described numerical representations of the attack data and/or the vulnerability data based on such expert entity feedback. In this example, refining the mappings based on such expert entity feedback can constitute an active learning process. In this example, at operation 510, map component 108 can store refined versions of the mappings in, for instance, memory 104.

If it is determined (e.g., by expert entity 408) at operation 512 that the mappings are valid, at 514, computer-implemented method 500 can comprise providing (e.g., via vulnerability and attack technique association system 102 and/or map component 108) the mappings and/or refined versions of the mappings through an application programming interface (e.g., application programming interface (API) 410). For example, vulnerability and attack technique association system 102 and/or map component 108 can provide the mappings and/or refined versions of the mappings over a network (e.g., the Internet) to such an application programming interface (API).

In some embodiments, computer-implemented method 500 does not comprise operation 512. For example, in some embodiments, computer-implemented method 500 does not comprise validation or invalidation of the mappings (e.g., by expert entity 408). In these embodiments, computer-implemented method 500 can comprise proceeding directly from operation 510 to operation 514 (e.g., thereby bypassing and/or effectively eliminating operation 512 from computer-implemented method 500).

At 516, computer-implemented method 500 can comprise using (e.g., via security component 202, a security analyst entity) the mappings (e.g., the mappings and/or refined versions of the mappings) to generate a vulnerability management model (e.g., vulnerability management model 412). For example, a security entity such as, for instance, a security analyst entity (e.g., security component 202) can obtain the mappings and/or refined versions of the mappings via the application programming interface (API) described above at operation 514 and further use such mappings to generate a vulnerability management model in the same manner as security component 202 uses mappings defined by map component 108 to generate a vulnerability management model (e.g., as described above with reference to FIGS. 2 and 4).

At 518, computer-implemented method 500 can comprise using (e.g., via security component 202, a security analyst entity) the mappings (e.g., the mappings and/or refined versions of the mappings) to generate a risk management model (e.g., risk management model 414). For example, a security entity such as, for instance, a security analyst entity (e.g., security component 202) can obtain the mappings and/or refined versions of the mappings via the application programming interface (API) described above at operation 514 and further use such mappings to generate a risk management model in the same manner as security component 202 uses mappings defined by map component 108 to generate a risk management model (e.g., as described above with reference to FIGS. 2 and 4).

At 520, computer-implemented method 500 can comprise using (e.g., via security component 202, a security analyst entity) the mappings (e.g., the mappings and/or refined versions of the mappings) to perform a penetration test (e.g., penetration test 416). For example, a security entity such as, for instance, a security analyst entity (e.g., security component 202) can obtain the mappings and/or refined versions of the mappings via the application programming interface (API) described above at operation 514 and further use such mappings to perform a penetration test (e.g., on a computing resource and/or a computing system comprising the computing resource) in the same manner as security component 202 uses mappings defined by map component 108 to perform a penetration test (e.g., as described above with reference to FIGS. 2 and 4).

Figure 6:
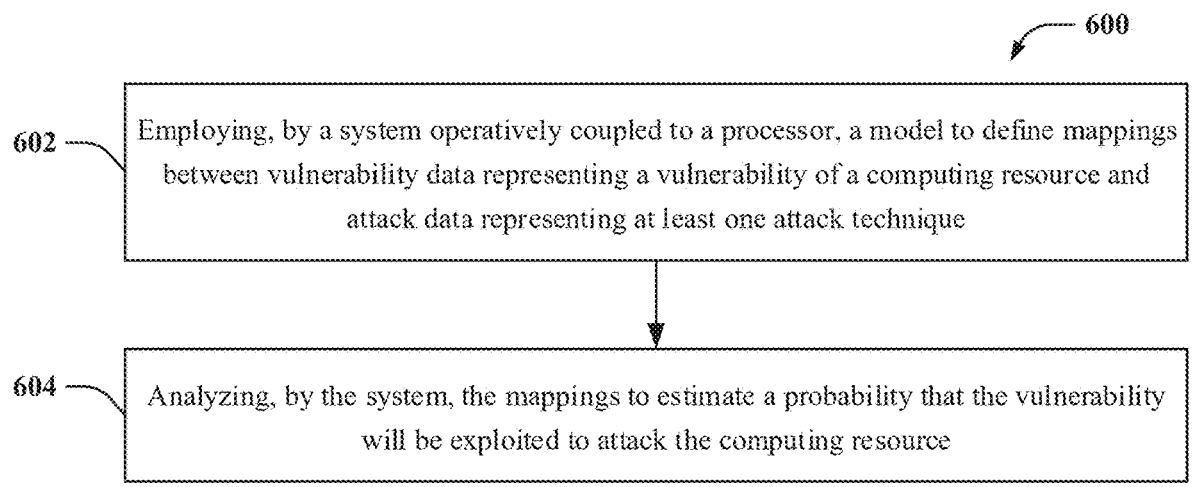

FIG. 6 illustrates a flow diagram of an example, non-limiting computer-implemented method 600 that can facilitate vulnerability and attack technique association in accordance with one or more embodiments described herein. Repetitive description of like elements and/or processes employed in respective embodiments is omitted for sake of brevity.

At 602, computer-implemented method 600 can comprise employing, by a system (e.g., via vulnerability and attack technique association system 102 and/or map component 108) operatively coupled to a processor (e.g., processor 106), a model (e.g., a BERT model) to define mappings (e.g., mappings 406) between vulnerability data (e.g., vulnerability data 404) representing a vulnerability of a computing resource (e.g., a computing software and/or hardware resource) and attack data (e.g., attack data 402) representing at least one attack technique.

At 604, computer-implemented method 600 can comprise analyzing, by the system (e.g., via vulnerability and attack technique association system 102 and/or estimation component 110), the mappings to estimate a probability (e.g., a relatively low, moderate, or high probability) that the vulnerability will be exploited to attack the computing resource.

Figure 7:
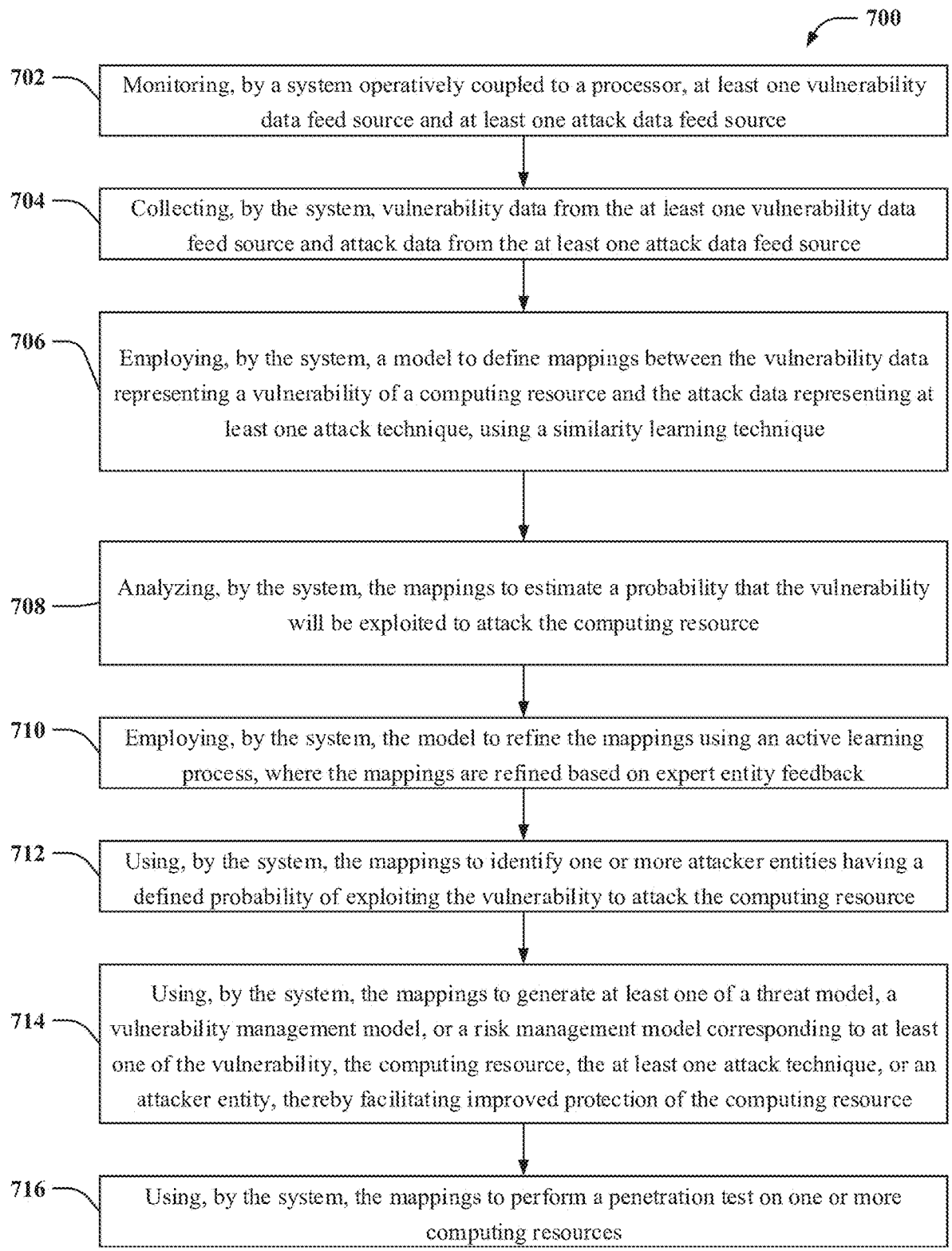

FIG. 7 illustrates a flow diagram of an example, non-limiting computer-implemented method 700 that can facilitate vulnerability and attack technique association in accordance with one or more embodiments described herein. Repetitive description of like elements and/or processes employed in respective embodiments is omitted for sake of brevity.

At 702, computer-implemented method 700 can comprise monitoring, by a system (e.g., via vulnerability and attack technique association system 102 and/or collection component 302) operatively coupled to a processor (e.g., processor 106), at least one vulnerability data feed source (e.g., the National Vulnerability Database (NVD), knowledge bases, security reports, blogs, or other suitable resources) and at least one attack data feed source (e.g., knowledge bases, security reports, blogs, or other suitable descriptions).

At 704, computer-implemented method 700 can comprise collecting, by the system (e.g., via vulnerability and attack technique association system 102 and/or collection component 302), vulnerability data (e.g., vulnerability data 404) from the at least one vulnerability data feed source and attack data (e.g., attack data 402) from the at least one attack data feed source.

At 706, computer-implemented method 700 can comprise employing, by the system (e.g., via vulnerability and attack technique association system 102 and/or map component 108), a model (e.g., a BERT model) to define mappings (e.g., mappings 406) between the vulnerability data representing a vulnerability of a computing resource and the attack data representing at least one attack technique using a similarity learning process (e.g., as described above with reference to the example embodiments depicted in FIGS. 1, 4, and 5).

At 708, computer-implemented method 700 can comprise analyzing, by the system (e.g., via vulnerability and attack technique association system 102 and/or estimation component 110), the mappings to estimate a probability (e.g., a relatively low, moderate, or high probability) that the vulnerability will be exploited to attack the computing resource.

At 710, computer-implemented method 700 can comprise employing, by the system (e.g., via vulnerability and attack technique association system 102, map component 108, and/or expert entity 408), the model to refine the mappings using an active learning process, where the mappings are refined based on expert entity feedback (e.g., where the mappings are refined based on feedback received from expert entity 408 as described above with reference to the example embodiments depicted in FIGS. 4 and 5).

At 712, computer-implemented method 700 can comprise using, by the system (e.g., via vulnerability and attack technique association system 102 and/or security component 202), the mappings (e.g., the mappings and/or refined versions of the mappings) to identify one or more attacker entities having a defined probability (e.g., a relatively low, moderate, or high probability) of exploiting the vulnerability to attack the computing resource (e.g., as described above with reference to the example embodiment depicted in FIG. 2).

At 714, computer-implemented method 700 can comprise using, by the system (e.g., via vulnerability and attack technique association system 102 and/or security component 202), the mappings (e.g., the mappings and/or refined versions of the mappings) to generate at least one of a threat model, a vulnerability management model (e.g., vulnerability management model 412), or a risk management model (e.g., risk management model 414) corresponding to at least one of the vulnerability, the computing resource, the at least one attack technique, or an attacker entity, thereby facilitating improved protection of the computing resource.

At 716, computer-implemented method 700 can comprise using, by the system (e.g., via vulnerability and attack technique association system 102 and/or security component 202), the mappings (e.g., the mappings and/or refined versions of the mappings) to perform a penetration test (e.g., penetration test 416) on one or more computing resources (e.g., one or more computing software and/or hardware resources and/or a computing system comprising such one or more computing software and/or hardware resources).

Vulnerability and attack technique association system 102 can be associated with various technologies. For example, vulnerability and attack technique association system 102 can be associated with computing system security technologies, ML and/or AI model technologies, cloud computing technologies, and/or other technologies.

Vulnerability and attack technique association system 102 can provide technical improvements to systems, devices, components, operational steps, and/or processing steps associated with the various technologies identified above. For example, vulnerability and attack technique association system 102 can define mappings between a vulnerability of a computing resource and one or more attack techniques that can be used to exploit the vulnerability and attack the computing resource. In this example, vulnerability and attack technique association system 102 can further use such mappings to perform a penetration test on a computing resource and/or to generate a vulnerability management model and/or a risk management model to prevent and/or mitigate exploitation of the vulnerability, thereby facilitating improved protection of the computing resource.

Vulnerability and attack technique association system 102 can provide technical improvements to a processing unit associated with vulnerability and attack technique association system 102. For example, the computing resource described above can comprise a processor (e.g., a CPU, processor 106, etc.). In this example, by defining the above described mappings that can be used to perform a penetration test on a processing unit (e.g., a CPU, processor 106, etc.) and/or to generate a vulnerability management model and/or a risk management model to prevent and/or mitigate exploitation of a vulnerability of the processing unit, vulnerability and attack technique association system 102 can thereby facilitate improved protection of the processing unit (e.g., improved protection from a potential cyberattack on the processing unit).

A practical application of vulnerability and attack technique association system 102 is that it can be implemented by a security analyst entity to protect a computing resource having a certain vulnerability by identifying one or more attack techniques having a defined probability (e.g., a relatively low, moderate, or high probability) of being used by one or more attacker entities to exploit the vulnerability and attack the computing resource. For example, practical application of vulnerability and attack technique association system 102 is that it can be implemented by a security analyst entity to generate a threat model, a vulnerability management model, and/or a risk management model based on the vulnerability and the one or more attack techniques described above and then prove or disprove the effectiveness of such models in protecting the computing resource by performing a penetration test on the computing resource.

It should be appreciated that vulnerability and attack technique association system 102 provides a new approach driven by relatively new cyberattack techniques used to exploit one or more vulnerabilities of one or more computing resources. For example, vulnerability and attack technique association system 102 provides a new approach to identify (e.g., automatically without input from a human) one or more attack techniques having a defined probability (e.g., a relatively low, moderate, or high probability) of being used by one or more specific attacker entities to exploit a particular vulnerability of a certain computing resource.

Vulnerability and attack technique association system 102 can employ hardware or software to solve problems that are highly technical in nature, that are not abstract and that cannot be performed as a set of mental acts by a human In some embodiments, one or more of the processes described herein can be performed by one or more specialized computers (e.g., a specialized processing unit, a specialized classical computer, a specialized quantum computer, etc.) to execute defined tasks related to the various technologies identified above. Vulnerability and attack technique association system 102 and/or components thereof, can be employed to solve new problems that arise through advancements in technologies mentioned above, employment of quantum computing systems, cloud computing systems, computer architecture, and/or another technology.

It is to be appreciated that vulnerability and attack technique association system 102 can utilize various combinations of electrical components, mechanical components, and circuitry that cannot be replicated in the mind of a human or performed by a human, as the various operations that can be executed by vulnerability and attack technique association system 102 and/or components thereof as described herein are operations that are greater than the capability of a human mind. For instance, the amount of data processed, the speed of processing such data, or the types of data processed by vulnerability and attack technique association system 102 over a certain period of time can be greater, faster, or different than the amount, speed, or data type that can be processed by a human mind over the same period of time.

According to several embodiments, vulnerability and attack technique association system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that vulnerability and attack technique association system 102 can include information that is impossible to obtain manually by an entity, such as a human user. For example, the type, amount, and/or variety of information included in vulnerability and attack technique association system 102, map component 108, estimation component 110, security component 202, and/or collection component 302 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
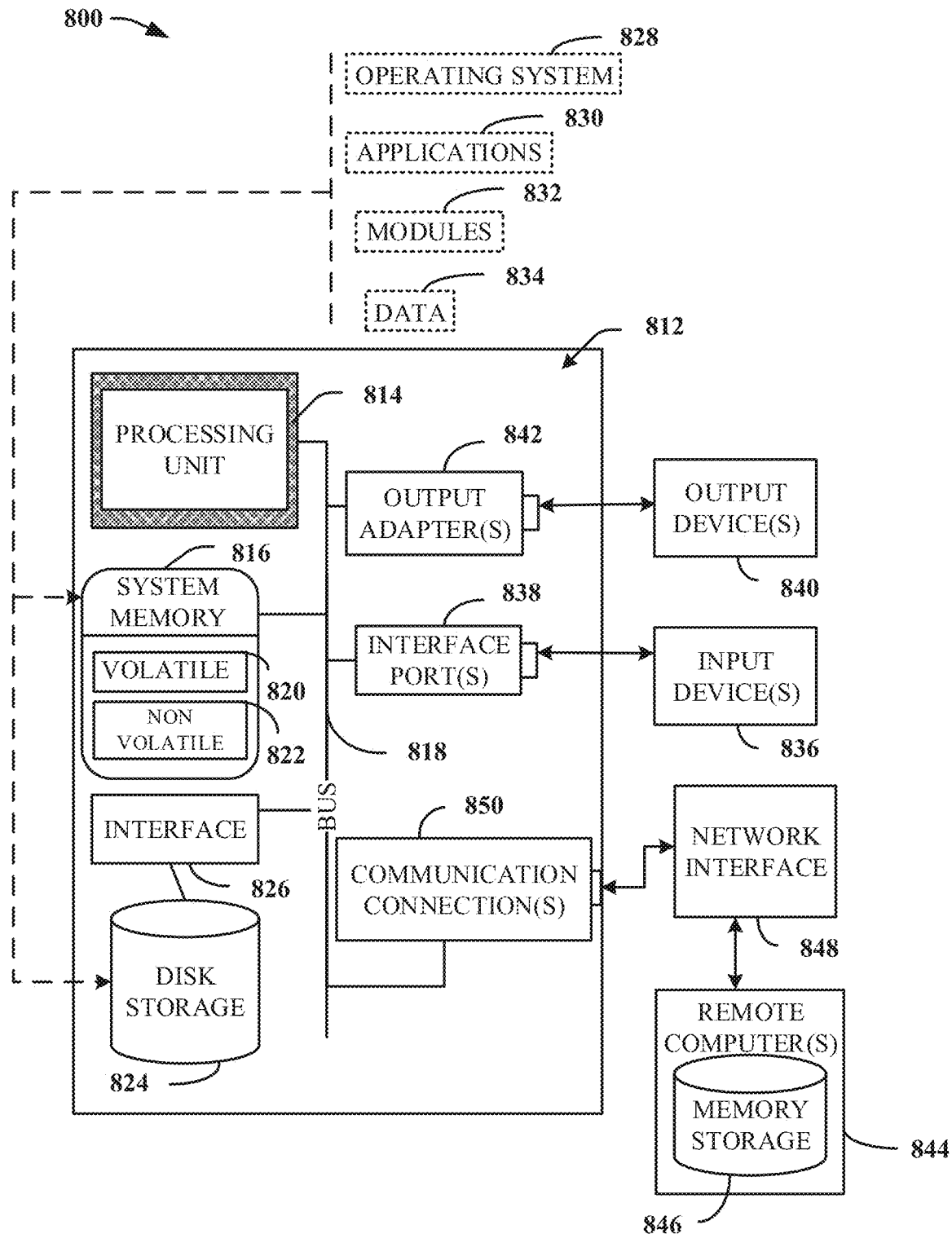
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
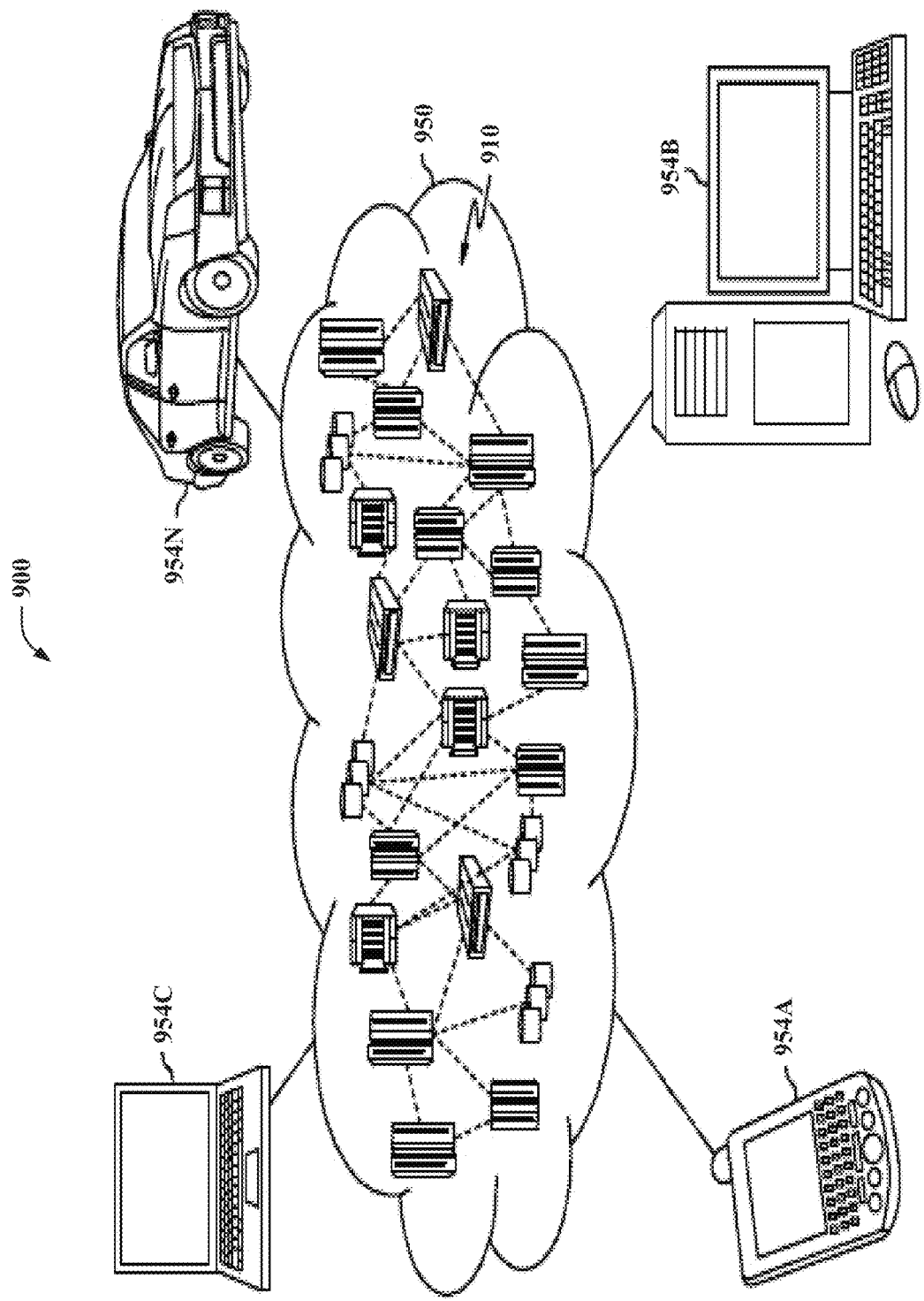
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
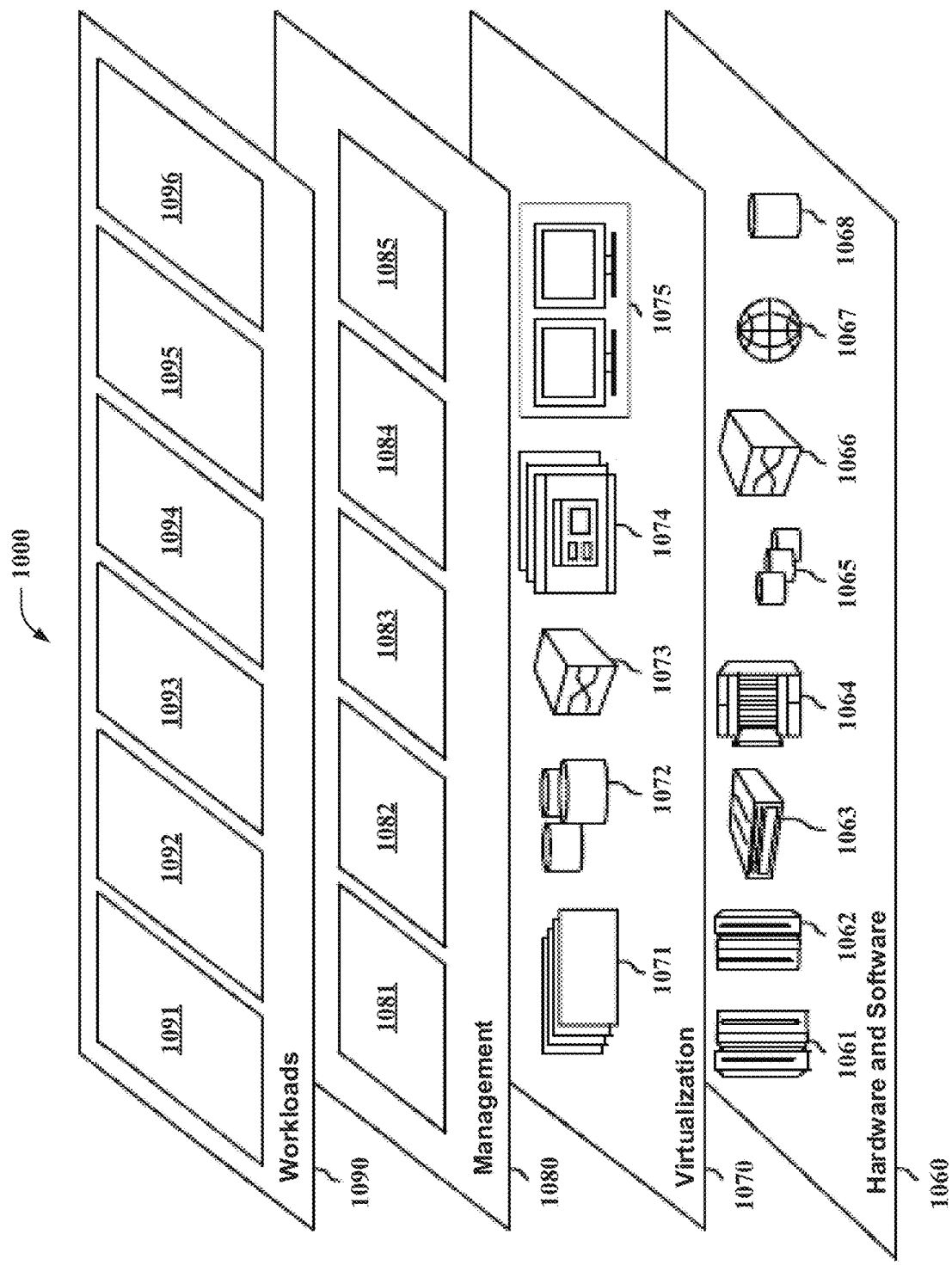
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and vulnerability and attack technique association software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a map component that defines mappings between vulnerability data representing a vulnerability of a computing resource and attack data representing at least one attack technique by using a bidirectional encoder representations from transformers (BERT) model based on machine learning to generate a first numerical representation for the vulnerability and a second numerical representation for the at least one attack technique in a Euclidean space;
        an estimation component that analyzes the mappings to estimate a probability that the vulnerability will be exploited to attack the computing resource, based on a Euclidean distance of the second numerical representation falling within a defined radius of the first numerical representation; and
        a security component that uses the mappings to identify one or more attacker entities having a defined probability of exploiting the vulnerability to attack the computing resource.

2. The system of claim 1, wherein the security component uses the defined probability of exploiting the vulnerability to assign respective levels of risk to the one or more attacker entities.

3. The system of claim 1, wherein the security component further uses the mappings to generate at least one of a threat model, a vulnerability management model, or a risk management model corresponding to at least one of the vulnerability, the computing resource, the at least one attack technique, or an attacker entity, thereby facilitating improved protection of the computing resource.

4. The system of claim 1, wherein the security component further uses the mappings to perform a penetration test on one or more computing resources.

5. The system of claim 1, wherein the map component employs a model to define the mappings using a similarity learning process.

6. The system of claim 1, wherein the map component employs a model to refine the mappings using an active learning process, and wherein the mappings are refined based on expert entity feedback.

7. The system of claim 1, wherein the computer executable components further comprise:
a collection component that monitors at least one vulnerability data feed source and at least one attack data feed source, and wherein the collection component further collects the vulnerability data from the at least one vulnerability data feed source and the attack data from the at least one attack data feed source.

8. A computer-implemented method, comprising:
employing, by a system operatively coupled to a processor, a map component to define mappings between vulnerability data representing a vulnerability of a computing resource and attack data representing at least one attack technique by using a BERT model based on machine learning to generate a first numerical representation for the vulnerability and a second numerical representation for the at least one attack technique in a Euclidean space;
analyzing, by the system, the mappings to estimate a probability that the vulnerability will be exploited to attack the computing resource, based on a Euclidean distance of the second numerical representation falling within a defined radius of the first numerical representation; and
using, by the system, the mappings to identify one or more attacker entities having a defined probability of exploiting the vulnerability to attack the computing resource.

9. The computer-implemented method of claim 8, further comprising:
using, by the system, the defined probability of exploiting the vulnerability to assign respective levels of risk to the one or more attacker entities.

10. The computer-implemented method of claim 8, further comprising:
using, by the system, the mappings to generate at least one of a threat model, a vulnerability management model, or a risk management model corresponding to at least one of the vulnerability, the computing resource, the at least one attack technique, or attacker entity, thereby facilitating improved protection of the computing resource.

11. The computer-implemented method of claim 8, further comprising:
using, by the system, the mappings to perform a penetration test on one or more computing resources.

12. The computer-implemented method of claim 8, further comprising:
employing, by the system, a model to define the mappings using a similarity learning process.

13. The computer-implemented method of claim 8, further comprising:
employing, by the system, a model to refine the mappings using an active learning process, wherein the mappings are refined based on expert entity feedback.

14. The computer-implemented method of claim 8, further comprising:
monitoring, by the system, at least one vulnerability data feed source and at least one attack data feed source; and
collecting, by the system, the vulnerability data from the at least one vulnerability data feed source and the attack data from the at least one attack data feed source.

15. A computer program product comprising a computer readable storage medium having program instructions embodied therewith, the program instructions executable by a processor to cause the processor to:
employ, by the processor, a map component to define mappings between vulnerability data representing a vulnerability of a computing resource and attack data representing at least one attack technique by using a BERT model based on machine learning to generate a first numerical representation for the vulnerability and a second numerical representation for the at least one attack technique in a Euclidean space;
analyze, by the processor, the mappings to estimate a probability that the vulnerability will be exploited to attack the computing resource, based on a Euclidean distance of the second numerical representation falling within a defined radius of the first numerical representation; and
use, by the processor, the mappings to identify one or more attacker entities having a defined probability of exploiting the vulnerability to attack the computing resource.

16. The computer program product of claim 15, wherein the program instructions are further executable by the processor to cause the processor to:
use, by the processor, the defined probability of exploiting the vulnerability to assign respective levels of risk to the one or more attacker entities.

17. The computer program product of claim 15, wherein the program instructions are further executable by the processor to cause the processor to:
use, by the processor, the mappings to generate at least one of a threat model, a vulnerability management model, or a risk management model corresponding to at least one of the vulnerability, the computing resource, the at least one attack technique, or an attacker entity, thereby facilitating improved protection of the computing resource.

18. The computer program product of claim 15, wherein the program instructions are further executable by the processor to cause the processor to:
use, by the processor, the mappings to perform a penetration test on one or more computing resources.

19. The computer program product of claim 15, wherein the program instructions are further executable by the processor to cause the processor to:
employ, by the processor, a model to define the mappings using a similarity learning process.

20. The computer program product of claim 15, wherein the program instructions are further executable by the processor to cause the processor to:
employ, by the processor, a model to refine the mappings using an active learning process, wherein the mappings are refined based on expert entity feedback.

* * * * *